(12) United States Patent
Morein

(10) Patent No.: US 6,188,412 B1
(45) Date of Patent: Feb. 13, 2001

(54) METHOD AND APPARATUS FOR PERFORMING SETUP OPERATIONS IN A VIDEO GRAPHICS SYSTEM

(75) Inventor: Stephen L. Morein, Cambridge, MA (US)

(73) Assignee: ATI Technologies, Inc., Thornhill (CA)

( * ) Notice: Under 35 U.S.C. 154(b), the term of this patent shall be extended for 0 days.

(21) Appl. No.: 09/141,815

(22) Filed: Aug. 28, 1998

(51) Int. Cl.[7] .................................................. G06F 13/00
(52) U.S. Cl. .......................................... 345/523; 345/502
(58) Field of Search ..................................... 345/501–503, 345/505, 507–509, 523

(56) References Cited

U.S. PATENT DOCUMENTS 5,872,902 * 2/1999 Kuchkuda et al. ................... 345/430

* cited by examiner

Primary Examiner—Kee M. Tung
(74) Attorney, Agent, or Firm—Markison & Reckamp, P.C.

(57) ABSTRACT

A method and apparatus performing setup operations in a video graphics system is accomplished by receiving a stream of primitives and determining if each primitive in the stream has a parameter that exceeds the calculation range of a fast multiplier. If it is determined that the primitive exceeds the capabilities of the fast multiplier, the calculations for the primitive are routed to a setup engine that includes a full-size multiplier, and the calculations of setup parameters are performed by the full-size multiplier. If it is determined that the calculations are within the capabilities of the fast multiplier, the calculations for the primitive are routed to the setup engine that includes one or more fast multipliers, and the setup calculations are performed therein. The results of the two setup engines are combined to form a resultant stream that includes the parameter calculations required from display setup operations.

22 Claims, 4 Drawing Sheets

METHOD AND APPARATUS FOR PERFORMING SETUP OPERATIONS IN A VIDEO GRAPHICS SYSTEM

FIELD OF THE INVENTION

The invention relates generally to video graphics processing and more particularly to a method and apparatus for performing setup operations prior to rasterization in a video graphics system.

BACKGROUND OF THE INVENTION

Computers are used in many applications. As computing systems continue to evolve, the graphical display requirements of the systems become more demanding. This is especially true in applications where detailed graphical displays must be updated quickly. Displaying complex graphical images involves a great deal of calculations that determine the final color of each pixel in the display. These calculations can become so complex that they create a bottleneck in the display generation process.

In a typical video graphics system, screen displays are made up of a plurality of graphical primitives. Rasterization is the process by which a primitive is converted to a two-dimensional image. Rasterization can be split into two parts. The first part includes setup operations in which the values of parameters such as color and depth are calculated for the primitive. The parameters can vary across the primitive, and the range of variance can be significant. For example, the color of a primitive can vary greatly from one portion of the primitive to another. The second part of rasterization, actual rasterization, is performed by a rasterizer that expects scan line and pixel data for each primitive. Setup operations take representations of primitives in screen space and perform operations on the representations such that the results are properly formatted for the rasterizer. After setup, no per-primitive operations should be required.

Larger primitives and primitives with a greater variance in a particular parameter require more complex calculations. Complex calculations that involve a large number of data bits require large multipliers. Although large multipliers are capable of performing these complex calculations, they are slow and take up a great deal of area on integrated circuits. In order to speed up some setup operations, prior art systems have employed more than one multiplier, allowing these multipliers to operate in parallel. Each of these multipliers must be sized to accommodate the worst case calculation that can arise in the system. Therefore, if the worst case calculation would require a 32-bit multiplier, all multipliers will need to be 32-bits wide. Implementing multiple multipliers of this size can be prohibitively expensive, and each suffers from the lack of speed associated with large multipliers.

The lack of speed of the large multipliers causes a system that has an occasional large or complex primitive to suffer a large speed penalty. It is often the case that in such systems, the majority of the primitives are small and could be handled with smaller less-complex multipliers. However, because of the occasional large primitive, the system must include large multipliers as the small multipliers are unable to handle large primitives.

Consequently, a need exists for a method and apparatus for performing setup operations that will accommodate both large and small primitives in a fast, efficient manner.

DETAILED DESCRIPTION OF A PREFERRED EMBODIMENT OF THE INVENTION

Figure 1:
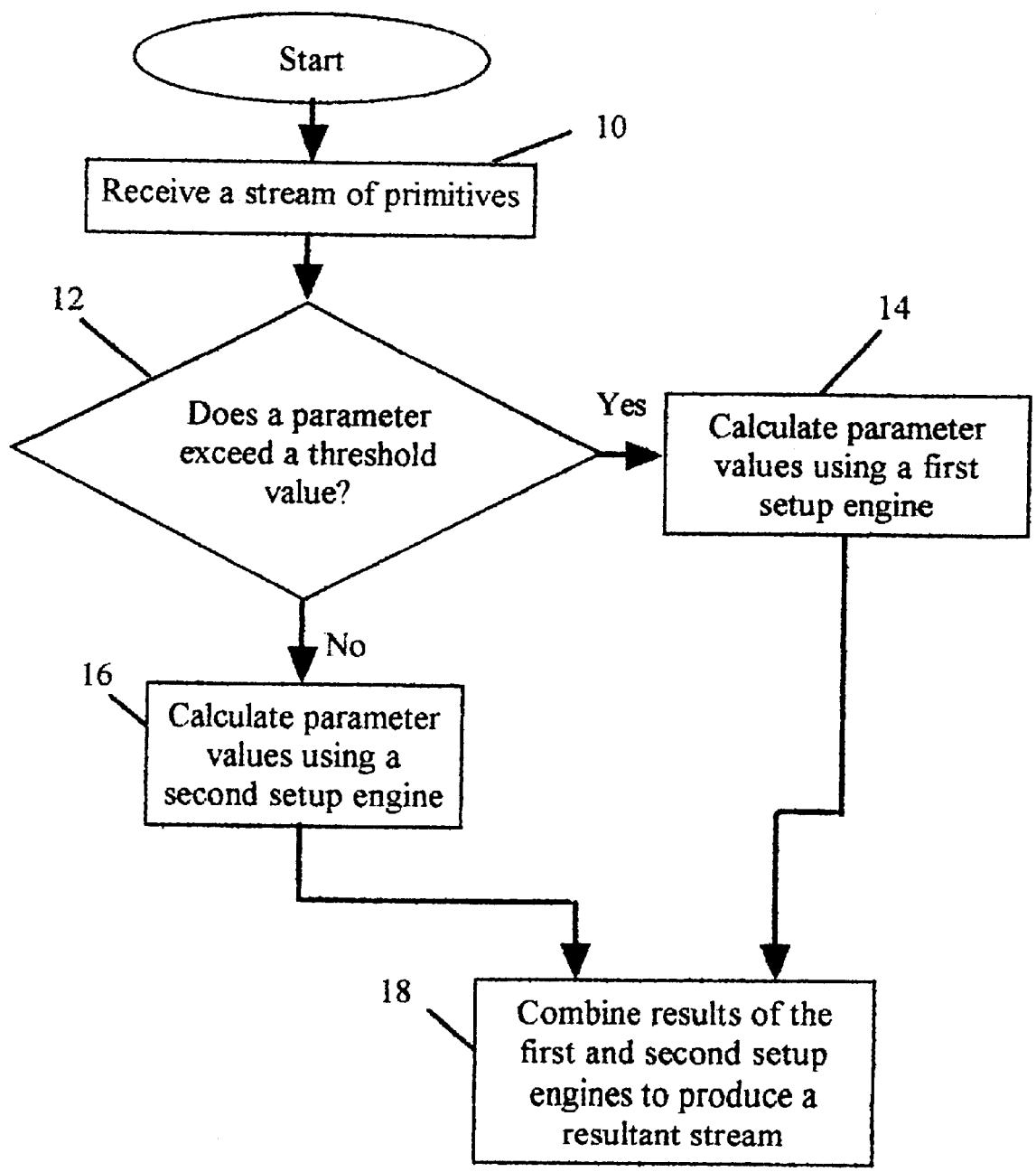
FIG. 1 illustrates a flow chart of a method for parameter calculation for a primitive in accordance with the present invention.

Generally, the present invention provides a method and apparatus for performing setup operations in a video graphics system. This is accomplished by receiving a stream of primitives and determining if each primitive in the stream has a parameter that exceeds the calculation range of a fast multiplier. If it is determined that the primitive exceeds the capabilities of the fast multiplier, the calculations for the primitive are routed to a setup engine that includes a full-size multiplier, and the calculations of setup parameters are performed by the full-size multiplier. If it is determined that the calculations are within the capabilities of the fast multiplier, the calculations for the primitive are routed to the setup engine that includes one or more fast multipliers, and the setup calculations are performed therein. The results of the two setup engines are combined to form a resultant stream that includes the parameter calculations required from display setup operations. By routing the calculations for primitives that require a full-size multiplier to such a multiplier and allowing smaller primitives to be handled by a faster, smaller multiplier, the speed with which setup calculations can be performed is increased while minimizing the additional costs associated with having multiple multipliers in the system.

Primitives in video graphics systems are typically polygons, and preferably are triangles. Each triangle primitive of a system includes three vertices and corresponding parameter values at those vertices. In order to prepare a triangle primitive for rasterization, plane and edge equations need to be derived for each of the parameters associated with the primitive. Parameters that are associated with primitives include color, Z value (representing the depth or position of that portion of the primitive along the Z axis), textures, and the like. The variance of these parameters can be very large, and a large variance requires that a large arithmetic unit, or multiplier, be used to calculate the parameter values across the primitive.

It is often the case that the majority of the primitives are of limited size and limited range with respect to the variance of the parameters. In these cases, the large multipliers required by the large or high-variance primitives provide more calculating power than is required for these simpler primitives. By performing the calculations for these primitives using a smaller, pipelined multiplier, many more calculations can be performed in the time required if the large multipliers are used for all primitives in the system.

A system implementing the invention described herein utilizes a full-size setup arithmetic unit capable of performing calculations for the large and high-variance parameters and a fast setup arithmetic unit for performing calculations for simpler primitives. When a primitive is received by the system, the range or size of at least one parameter is compared with a threshold level to determine if the parameter is within a predetermined calculation range of the fast setup unit. If the parameter is within the range, the parameter values for that primitive are calculated using the fast setup unit. If the parameter values exceed the predetermined range, the calculations are performed by the full-size setup unit.

The present invention can be better understood by referring to FIGS. 1–4. FIG. 1 depicts a flow diagram of a method for a faster, more efficient method of calculating the parameter values for primitives in a video graphics display system. At step 10, a stream of primitives is received, where each primitive of the stream includes a plurality of parameters that describe the primitive. Preferably the stream of primitives is a stream of triangles, and the plurality of parameters provide the data points necessary such that after setup calculations are performed using the plurality of parameters, the resulting data will be compatible input for an actual rasterizer.

At step 12, it is determined whether one of the parameters of the plurality of parameters exceeds a threshold value that corresponds to that particular parameter. Preferably, the threshold value is based on the calculation capabilities of the faster or reduced-size multiplier present in the system. The parameter compared with the threshold value may be the area parameter such that the area comparison separates large triangles from small triangles. Other parameters may be compared based on their range, or the difference between the maximum and minimum value for the parameter within the primitive. This range may be compared with a threshold range rather than a threshold value to determine if the calculations for that parameter can be performed by the reduced-size multiplier.

At step 14, if the parameter is found to exceed the threshold, the parameter values for the primitive are calculated using a first setup engine. Preferably, the first setup engine includes a full-size multiplier or arithmetic unit that is capable of performing the calculations of the worst-case parameter size or variance that can be present in the system. The parameter values may be calculated for all of the parameters using the first setup engine, or only the values for the parameter that was compared with the threshold may be calculated by the first setup engine, and the remaining parameters may be compared with other thresholds to determine which setup engine will perform calculations for those parameters.

At step 16, if the parameter is found not to exceed the threshold, the parameter values for the primitive are calculated using a second setup engine. Preferably, the second setup engine includes a smaller, reduced-size multiplier or arithmetic unit, which allows the second setup engine to perform the required calculations more quickly than the first setup engine. The arithmetic unit of the second setup engine is smaller than that of the first, and more than one arithmetic unit may be provided in the second setup engine, where each of the arithmetic units can operate in parallel to the others. This parallelism further increases the speed and throughput of the second setup block, which in turn increases the overall speed of the setup system.

Preferably, the parameter calculations of steps 14 and 16 include calculating a plane equation for each parameter and calculating edge equations for each parameter. When the primitives of the system are triangles, calculating edge equations requires calculating three edge equations, one for each side of the triangle.

At step 18, the results of the first and second setup engines are combined to produce a resultant stream that includes parameter values for each parameter of each primitive of the stream of primitives. Preferably, the resultant stream is compatible with the input requirements of a rasterizer. If the parameter calculations for each primitive are split up such that only the calculations for large parameters are done in the full-size arithmetic unit, the output of one or both of the streams may be delayed and/or controlled such that the results of the two setup engines can be interleaved to maintain the grouping of parameters for each primitive. For example, if the color parameter calculations for a particular primitive are performed in the first setup engine and the remaining parameter calculations are performed in the second setup engine, the calculations of the first setup engine may be completed after the second setup engine calculations or vice-versa. In that case, parameter calculations for the next primitive might be intermingled with those of the particular primitive if some monitoring and control of the calculation results is not performed. In the case where the first engine completes its calculations first, the combining of the results of the first engine are delayed until the second engine completes the calculations for the other parameters of the primitive. When all of the parameter calculations are complete, the results of the two engines are combined.

In another situation, if all of the parameter calculations for a primitive are done in one of the two setup engines, the ordering of the primitives and their associated parameter calculations may be maintained to match that of the original primitive stream, or the ordering may be based on the time the calculations for each primitive are completed.

In an example system in which the method of FIG. 1 is employed, the first setup engine includes a full-size multiplier that is capable of performing 1 million calculations per second. In the same system, the second setup engine includes a reduced-size multiplier that, although it can not perform calculations as complex as the full-size multiplier is nearly fully pipelined and is capable of performing 25 million calculations per second. When the frequency of large primitives is very small, the system will operate at nearly the 25 million calculation per second rate while still being able to support the occasional large or complex primitive. This is a significant improvement over prior art systems that do not discriminate between large or complex primitives that require large, slow arithmetic units and the small, simple primitives that can be handled with smaller, faster arithmetic units.

Figure 2:
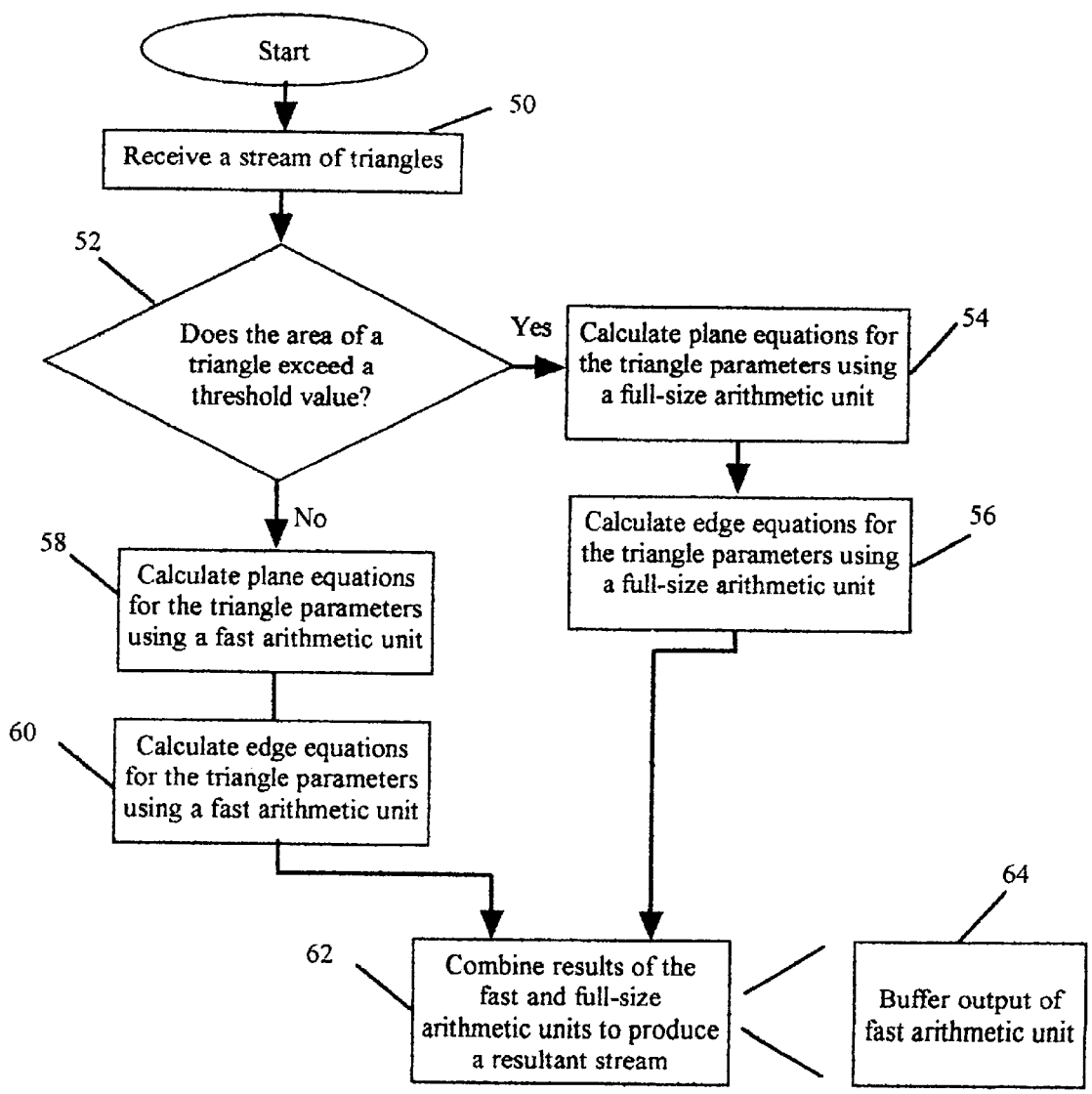
FIG. 2 illustrates a flow chart of a method for parameter calculation for primitives in a video graphics display system in accordance with the present invention.

FIG. 2 illustrates a method for calculating setup parameters for a stream of triangle primitives received in a video graphics system. At step 50, the stream of triangle primitives is received, where each triangle in the stream is described by a plurality of parameters. At step 52, the area of the triangle is compared with a threshold value to determine if the area of the triangle exceeds the area threshold value. Preferably, the threshold value represents the maximum calculation capabilities of a fast arithmetic unit that is part of a first setup engine. The comparison of the area of the triangle with the threshold value separates large triangles from smaller triangles. Preferably, large triangles are not more prevalent in the system than smaller triangles. This is typically the case in most video graphics applications.

If the area does not exceed the threshold value, at step 58, the plane equations for the triangle parameters are calculated using the fast arithmetic unit of the first setup engine. The fast arithmetic unit is able to perform the calculations rapidly due to efficient pipelining of the calculation hardware and limited calculation capacity. Similarly, at step 60, the edge equations for the smaller triangles are calculated using the fast arithmetic unit.

When the area of a triangle is found to exceed the threshold area value, the triangle is a large triangle that would exceed the calculation capabilities of the fast arithmetic unit of the first setup engine. Because of this, the triangle is routed through alternate hardware that is capable of performing the parameter calculations. At step 54, the plane equations for the parameters of the large triangle are calculated using a full-size arithmetic unit in a second setup engine. Similarly, at step 56, the edge equations for the triangle parameters are calculated using the full-size arithmetic unit. Preferably, three edge equations are calculated for each relevant parameter of each triangle.

Preferably, the full-size arithmetic unit is designed to be able to accommodate the required calculations of the largest triangle that the system may encounter. Because of its calculation range and capabilities, the full-size arithmetic unit is slower than the fast arithmetic unit. However, because large triangles occur with a much lower frequency than smaller triangles in most video graphics systems, the full-size arithmetic unit will not be used as frequently as the fast arithmetic unit. Therefore, each triangle of the stream of triangles will have an average parameter calculation time that is much shorter than the parameter calculation time of the full-size arithmetic unit.

At step 62, the results of the calculations performed by the fast and full-sized arithmetic units are combined to produce a resultant stream. Note that the parameters describing the stream of triangles that were originally received at step 50 may be included in this resultant stream. Preferably, the resultant stream is formatted to be compatible with additional rasterization hardware of the system.

The benefit of having two different arithmetic units in a video-graphics system employing the method of FIG. 2 can be realized even if the two units do not work in parallel. This is because the faster calculation speed of the fast arithmetic unit will be realized by the majority of the triangles. Although the full-size arithmetic unit is present, it will only be used when required. Thus the stream of triangles will be processed more quickly than prior art systems that have a single full-size arithmetic unit handling both small and large triangles.

Additional speed can be achieved by using the two arithmetic units in parallel. While the full-size unit is processing a large triangle, the fast unit can perform the calculations for one or more small triangles. In cases where the ordering of the triangles and corresponding data in the resultant data stream is important, some buffering, or temporary storage of data may need to be performed in the system. The combining step 62 may further include step 64 where the output of the fast arithmetic unit is buffered in order to maintain the ordering of the output. If the full-size unit is processing a large triangle in the stream of triangles and the fast unit is processing smaller triangles which had been located behind, or upstream from the large triangle such that they arrived after the large triangle, the calculation for some of these triangles will complete before the calculations for the large triangle. By buffering or stalling the combination of these smaller triangles with the rest of the resultant stream until the large triangle and its data have been added, the ordering of the stream can be maintained.

Figure 3:
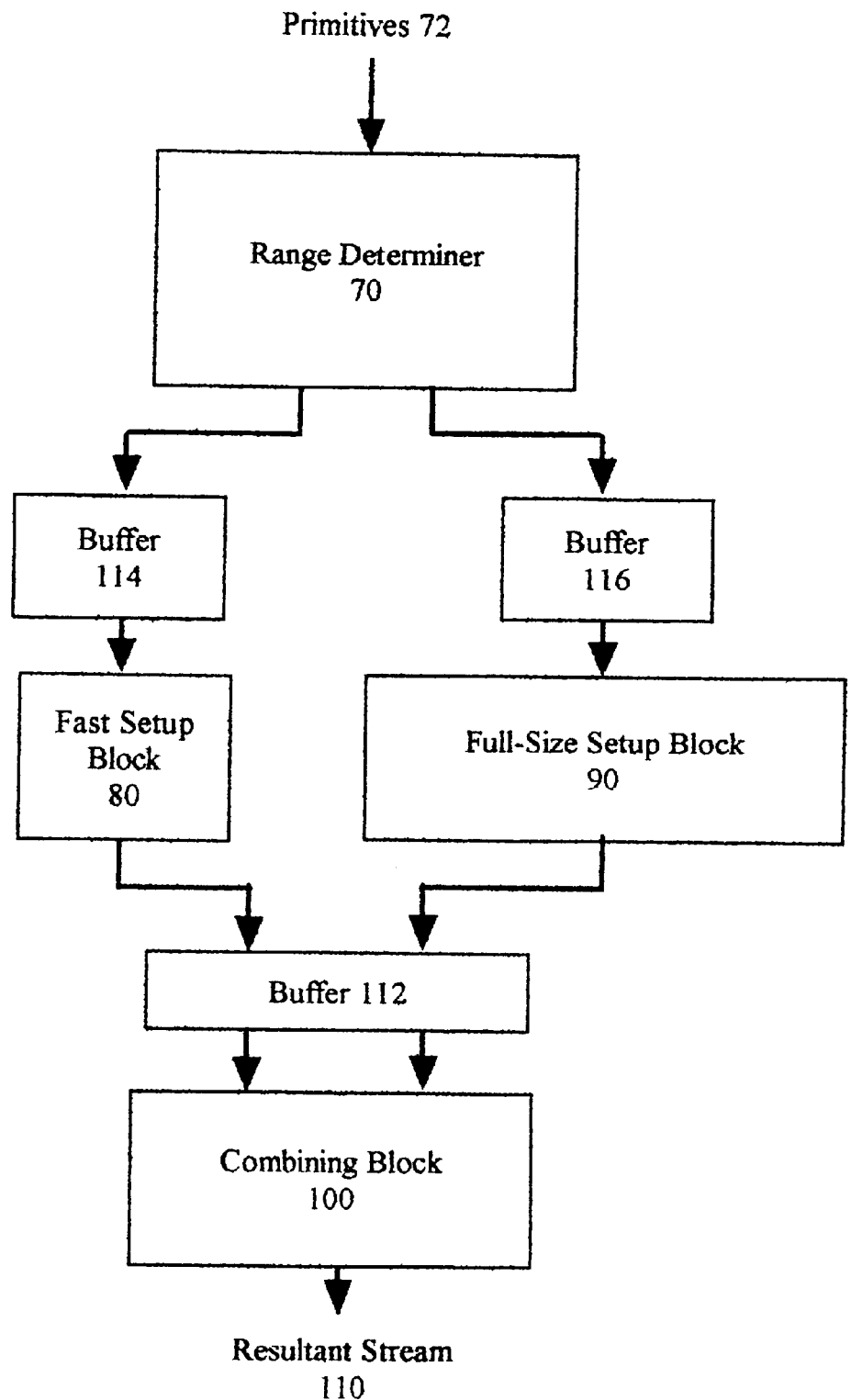
FIG. 3 illustrates a block diagram of an apparatus for performing setup operations in accordance with the present invention.

FIG. 3 illustrates an apparatus for preparing graphics primitives for rasterization in a video graphics system. The apparatus includes a range determiner 70, a fast setup block 80, a full-size setup block 90, and a combining block 100. Preferably, the apparatus is implemented as part of a video graphics system that may be implemented on a single integrated circuit or chip, may be a board level implementation, or may be a general computer processor that has been configured by software to perform the specific functions attributed to the blocks of FIG. 3.

The range determiner 70 receives a stream of graphics primitives 72 and determines a range of at least one parameter of each primitive. For example, the range determiner 70 may determine the color range for a primitive by subtracting the smallest color value of the primitive from the largest color value. In another embodiment, the range determiner 70 determines the range of the area of the primitive, where the area range is the total area of the primitive.

Once it has determined the range of at least one of the parameters of the primitive, the range determiner 70 allocates calculation of the parameter values for the primitive to either the fast setup block 80 or the full-size setup block 90. The allocation of calculation operations is based on the range that was determined for the parameters. If the range or size of the parameter is above a threshold value, the range determiner 70 passes the variables for calculation to the full-size setup block 90. The full-size setup block 90 includes a full-size arithmetic unit, or multiplier, that is capable of performing the required calculations for a primitive that has a parameter range that exceeds the threshold value.

As described with regard to FIGS. 1 and 2 above, such full-size arithmetic units are typically much slower than smaller arithmetic units that have more limited calculation ranges. If the range determiner 70 finds that the range does not exceed the threshold value, the calculations are assigned to the fast setup block 80 which includes a reduced-size, faster arithmetic unit. The full-size setup block 90 is therefore capable of performing more complex calculations than the fast setup block 80, but the fast setup block 80 is capable of performing the simpler or smaller calculations more quickly. Additionally, the fast setup block 80 may include more than one reduced size arithmetic unit operating in parallel to further increase the speed of calculations.

It should be noted that the range determiner 70 may find the range of more than one parameter for each primitive, and may further allocate calculation of specific parameters to each of the setup blocks 80 and 90. In one embodiment, the range determiner 70 assigns all of the parameter calculations for a primitive performed by the full-size setup block 90 if any one of many parameters exceeds a threshold value associated with that parameter. For example, if the color range is within the threshold associated with color, but the Z value range is greater than the Z value threshold, all of the calculations for the primitive, including color, may be performed using the full-size setup block 90.

In another embodiment, the range determiner 70 may have all of the parameter calculations for a primitive performed by the full-size setup block 90 if a single, specific parameter exceeds a threshold value associated with that parameter. For example, if the area of the primitive is greater than the threshold value, all the calculations may be performed using the full-size setup block 90. The other parameters are effectively disregarded by the range determiner 70.

In yet another embodiment, the range determiner 70 assigns calculation of each parameter on an individual basis. For example, the range determiner 70 may determine that the color range for a primitive is within a threshold range and therefore assign calculation of that parameter for that primitive to the fast setup block 80. If the range of the Z value parameter for the same primitive exceeds the Z value range threshold, the Z value calculations may be assigned to the full-size setup block 90. The range determiner 70 may be designed and programmed to be flexible in how it controls the calculation of the various parameter values using the two setup blocks 80 and 90.

As was described above, the parameter values for a primitive preferably include a plane equation and a plurality of edge equations. More preferably, the primitives of the video graphics system are triangles, and the calculation requirements for the triangles include three edge equations and one plane equation for a predetermined set up parameters.

The combining block 100 combines the output of the fast and full-size setup blocks 80 and 90 to produce an output data stream, or resultant stream 110. The combining block 100 may be further configured such that it is able to delay or store the output of the setup blocks 80 and 90 in such a way to allow it to interleave the data to reproduce the original ordering of the primitives in the stream of primitives 72. For example, if the color parameters for a primitive are calculated by the fast setup block 80 and the Z value parameters for the primitive are calculated by the full-size setup block 90, the color parameters are likely to be completed well before the Z value parameters. Other calculations may be performed by the fast setup block 80 while the Z value parameters are being calculated. Because the results of these other calculations are most likely not wanted to be inserted between the color parameters and the Z value parameters, the other results of the other calculations may be stored until the Z value calculations are complete before they are added to the end of the resultant stream 110.

This delay or storage of output from the setup blocks 80 and 90 may be accomplished using buffer 112. Buffer 112 may be controlled either through control signals from the range determiner 70 or either setup block or may be controlled by control elements or tokens which are inserted into the data stream fed to the setup blocks 80 and 90. For example, if the Z value calculations for a parameter of a primitive are calculated using the full-size setup block 90, a token may be placed after the data for calculation in the fast setup block 80 that indicates where the results of the Z value calculations are to be inserted. It should be apparent to one skilled in the art that various methods may be employed to control the distribution of the calculations between the two setup blocks that allows the data to be recombined in the desired order in the combining block 100.

In another embodiment, buffers 114 and 116 may be included in the apparatus—either together or individually. Buffers 114 and 116 allow pending calculations for the setup blocks 80 and 90 to be queued up. By queuing up or buffering the calculations, the best utilization of the calculations resources may be achieved. This is evidenced by considering the case where two sets of calculations are presented which require the full-size setup block 90, and where the calculations are located in proximity to each other in the stream of primitives 72. Buffer 116 allows the second of these operations to be queued up, allowing the range determiner 70 to move on to allocating calculations to the fast setup block 80 while the full-size setup block 90 performs the calculations. Without the buffer 116, the range determiner 70 might have to wait for the first set of calculations to be completed by the full-size setup block 90 before being able to initiate the second set of calculations. Buffer 114 allows for similar queuing of fast calculations, enabling the range determiner to move further down the primitive stream 72 to larger calculations that are to be assigned to the full-size setup block 90. The buffers 114 and 116 allow the system to operate in such a way as to provide maximum throughput.

Figure 4:
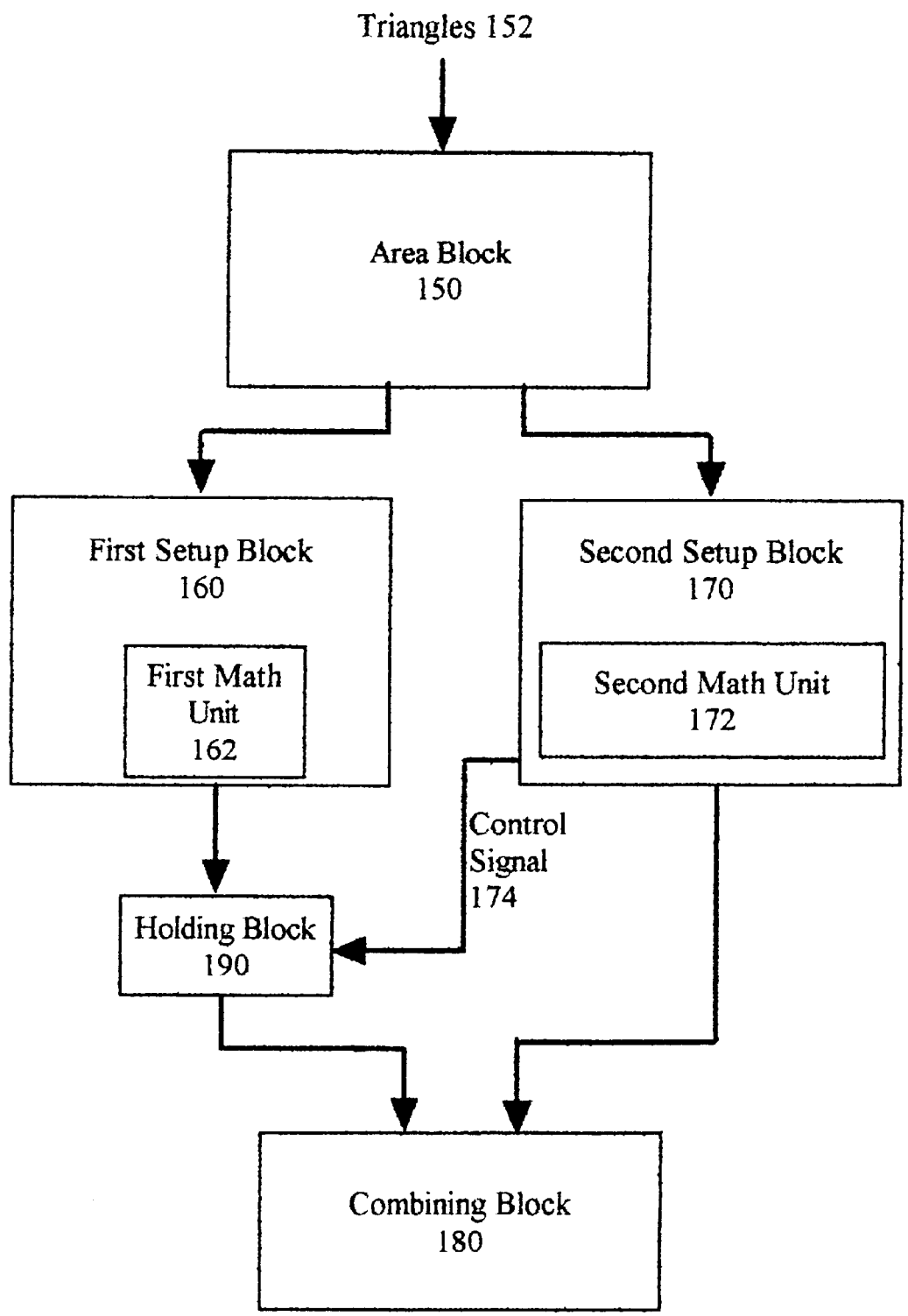
FIG. 4 illustrates a block diagram of another apparatus for performing setup operations in accordance with the present invention.

FIG. 4 illustrates an apparatus for preparing triangle primitives for rasterization in a video graphics environment. The apparatus includes first setup block 160, second setup block 170, area block 150, and combining block 180. The first setup block 160 includes a first arithmetic unit, or math unit 162. The second setup block 170 includes a second arithmetic unit, or math unit 172. The second math unit 172 is larger than the first math unit 162, and is therefore capable of performing more complex calculations. The first math unit 162, however, is faster than the second math unit 172. Both setup blocks 160 and 170 are configured to receive triangles or data describing triangle primitives and calculate parameter values for the triangles. The calculations performed by the setup blocks 160 and 170 are in preparation for rasterization of the triangle primitives.

The area block 150 receives the stream of triangle primitives 152 and determines if the area of each triangle primitive in the stream 152 exceeds an area threshold. If the area of a triangle exceeds the threshold, the triangle is passed to the second setup block 170, where the calculations for the larger triangles can be performed using the larger second math unit 172. If the area of the triangle is below the threshold, the triangle is processed by the first setup block 160 using the smaller, faster first math unit 162.

The combining block 180 combines the output from the first and second setup blocks 160 and 170. Preferably, the combining block formats this data in a manner appropriate for output to a rasterizer, where the formatting may include ordering of parameters. In one embodiment, the apparatus includes holding block 190 which stores some of the output from the first setup block 160 based on a control signal 174 from the second setup block 170. The second setup block 170 asserts the control signal 174 in such a way as to delay data from the first setup block 160 until the second setup block 170 completes calculations that produce data which should precede data that has already been calculated in the first setup block 160. The control signal 174 assertion may be triggered by tokens or markers intermingled with the data fed to the second setup block 170 by the area block 150.

The present invention provides a method and apparatus for accelerating the setup process which occurs as part of video graphics rasterization. By separating large, complex primitives from simpler primitives, calculation of parameters for the primitives can be accomplished in a faster, more efficient manner. The structure provided by such a system is further suited for pipelining and buffering to further improve the throughput of the setup circuitry. Such pipelining can reduce the effective time to calculate parameters for a primitive to a time proximate to that of the faster of the two arithmetic units of the system.

Software algorithms that cause a processor or controller to perform the functions of the methods illustrated herein may be stored in any manner of computer readable medium, including, but not limited to, a diskette, magnetic tape, ROM, RAM, a hard disk, or a CD-ROM. Execution of the software by a processor will cause the processor to operate in a specific and predetermined manner such that it performs the steps or functions required by the methods described above. In some embodiments, circuitry or hardware may perform some or all of the steps or functions, whereas other steps or functions are performed in software.

It should be understood that the implementation of other variations and modifications of the invention in its various aspects will be apparent to those of ordinary skill in the art, and that the invention is not limited by the specific embodiments described. For example, multiple setup blocks may be implemented in parallel to further improve the capacity of the setup operations. It is therefore contemplated to cover by the present invention, any and all modifications, variations, or equivalents that fall within the spirit and scope of the basic underlying principles disclosed and claimed herein.

What is claimed is:

1. A method for parameter calculation for a primitive in a video graphics display system, the method comprising:
   receiving the primitive, wherein the primitive is described by at least one parameter;
   determining if the one parameter is within a predetermined calculation range;
   when the one parameter is within the predetermined calculation range, calculating parameter values for the primitive using a fast setup arithmetic unit; and
   when the one parameter is not within the predetermined calculation range, calculating the parameter values for the primitive using a full-size setup arithmetic unit.

2. A method for parameter calculation for primitives in a video graphics display system, the method comprising:
   receiving a stream of primitives, wherein each primitive of the stream of primitives includes a plurality of parameters that describe the primitive;
   determining if a first parameter of the plurality of parameters exceeds a threshold value;
   when the first parameter exceeds the threshold value, calculating parameter values for at least the first parameter of the primitive using a first setup engine;
   when the first parameter does not exceed the threshold value, calculating the parameter values for at least the first parameter of the primitive using a second setup engine;
   combining results of the first setup engine and the second setup engine to produce a resultant stream, wherein the resultant stream includes the parameter values for each parameter of each primitive of the stream of primitives.

3. The method of claim 2, wherein the first setup engine includes a full-size arithmetic unit, wherein the second setup engine includes a reduced-size arithmetic unit, and wherein the reduced-size arithmetic unit is faster than the full-size arithmetic unit.

4. The method of claim 3, wherein the second setup engine includes a plurality of reduced-size arithmetic units.

5. The method of claim 3, wherein the step of combining results is performed such that the ordering of primitives in the resultant stream matches ordering of the primitives of the stream of primitives.

6. The method of claim 5, wherein combining results further comprises delaying adding output of at least one of the first setup engine and the second setup engine to the resultant stream such that the ordering of the primitives in the resultant stream matches ordering of the primitives in the stream of primitives.

7. The method of claim 6, wherein calculating parameter values further comprises calculating a plane equation for each parameter.

8. The method of claim 7, wherein calculating parameter values further comprises calculating edge equations for each parameter.

9. The method of claim 8, wherein receiving a stream of primitives further comprises receiving a stream of triangle primitives, and wherein calculating parameter values further comprises calculating three edge equations for each parameter.

10. The method of claim 6, wherein the step of determining further comprises comparing an area parameter of the plurality of parameters for each primitive with a threshold area value.

11. The method of claim 6, wherein the step of determining further comprises comparing a range of the first parameter of the plurality of parameters for each primitive with a threshold range value, wherein the range of the first parameter measures a difference between a maximum and minimum value for the first parameter.

12. An apparatus for preparing graphics primitives for rasterization, the apparatus comprising:
   a fast setup block that includes at least one reduced-size arithmetic unit, wherein the at least one reduced-size arithmetic unit calculates parameter values for graphics primitives;
   a full-size setup block that includes a full-size arithmetic unit, wherein the full-size arithmetic unit calculates parameter values for graphics primitives, and wherein the full-size arithmetic unit can perform more complex calculations than the at least one reduced-arithmetic unit of the fast setup block;
   a range determiner operably coupled to the fast setup block and the full-size setup block, wherein the range determiner receives a stream of graphics primitives and determines a range of at least one parameter of each graphics primitive of the stream of graphics primitives, wherein, based on the range, the range determiner allocates calculation of parameter values for each graphics primitive to one of the fast setup block and the full-size setup block; and
   a combining block operably coupled to the fast setup block and the full-size setup block, wherein the combining block combines output of the fast setup block with output of the full-size setup block to produce a resultant stream.

13. The apparatus of claim 12, wherein the range determiner is further configured such that when the range of a first parameter exceeds a threshold range corresponding to the first parameter, the range determiner causes parameter values for the first parameter to be calculated using the full-size setup block.

14. The apparatus of claim 13, wherein the range determiner is further configured such that when the range of the first parameter does not exceed the threshold range corresponding to the first parameter, the range determiner causes the parameter values for the first parameter to be calculated using the fast setup block.

15. The apparatus of claim 14, wherein the range determiner is further configured such that when the range of the first parameter exceeds the threshold range corresponding to the first parameter, the range determiner causes parameter values for all parameters of the corresponding graphics primitive to be calculated using the full-size setup block.

16. The apparatus of claim 13, wherein the first setup block and the full-size setup block calculate plane equations as part of parameter values for each parameter.

17. The apparatus of claim 16, wherein the first setup block and the full size setup block calculate a plurality of edge equations as part of the parameter values for each parameter.

18. The apparatus of claim 17, wherein each of the graphics primitives is a triangle primitive, and wherein the fast setup block and the full-size setup block calculate three edge equations as part of the parameter values for each parameter.

19. The apparatus of claim 18, wherein the combining block further comprises a buffer, wherein the buffer stores portions of output from at least one of the fast setup block and the full-size setup block such that output from the fast setup block and the full-size setup block can be interleaved such that ordering of the primitives and corresponding parameter values of the resultant stream matches ordering of primitives in the stream of primitives.

20. The apparatus of claim 19, further comprising:
a first buffer operably coupled to the range determiner and the fast setup block, where the first buffer stores pending calculation data directed to the fast setup block by the range determiner; and
a second buffer operably coupled to the range determiner and the full-size setup block, where the second buffer stores pending calculation data directed to the full-size setup block by the range determiner.

21. An apparatus for preparing triangle primitives for rasterization, comprising:
a first setup block that receives triangles and calculates parameter values for the triangles using a first arithmetic unit;
a second setup block that receives triangles and calculates parameter values for the triangles using a second arithmetic unit, wherein the second arithmetic unit is larger than the first arithmetic unit;
an area block operably coupled to the first and second setup blocks, wherein the area block receives a stream of triangle primitives and determines if the area of each triangle primitive of the stream of triangle primitives exceeds an area threshold, wherein when a triangle primitive exceeds the area threshold, the triangle is passed to the second setup block, and wherein when the triangle primitive does not exceed the area threshold, the triangle is passed to the first setup block; and
a combining block operably coupled to the first and second setup blocks, wherein the combining block combines output from the first and second setup blocks.

22. The apparatus of claim 21, further comprising a holding block operably coupled to the first setup block, the second setup block, and the combining block, wherein the holding block stores some of the output from the first setup block based on a control signal from the second setup block.

* * * * *